United States Patent [19]

Schatteman

[11] Patent Number: 4,498,162
[45] Date of Patent: Feb. 5, 1985

[54] AUTOMATIC DISC LOADING APPARATUS

[75] Inventor: Etienne A. Schatteman, Wemmel, Belgium

[73] Assignee: Staar S. A., Belgium

[21] Appl. No.: 483,698

[22] Filed: Apr. 11, 1983

[30] Foreign Application Priority Data

Apr. 23, 1982 [BE] Belgium .................................. 892,952

[51] Int. Cl.³ ............................................. G11B 25/04
[52] U.S. Cl. ..................................... 369/77.1; 369/194
[58] Field of Search ........................ 369/176, 77.1, 194

[56] References Cited

U.S. PATENT DOCUMENTS

| | | | |
|---|---|---|---|
| 2,508,715 | 5/1950 | Harman | 369/77.1 |
| 2,525,926 | 10/1950 | Matthews | 369/77.1 |
| 3,220,734 | 11/1965 | Zarm | 369/77.1 |
| 3,561,768 | 2/1971 | Castagna | 369/77.1 |
| 4,302,832 | 11/1981 | Cheeseboro | 369/77.1 |

FOREIGN PATENT DOCUMENTS 130264  12/1982  Japan .................................. 369/77.1

Primary Examiner—Steven L. Stephan
Attorney, Agent, or Firm—Leydig, Voit, Osann, Mayer and Holt, Ltd.

[57] ABSTRACT

A disc player apparatus having mechanism for guiding and centering disc records of different size on a disc record drive having a vertical spindle. A horizontal plate for receiving a disc record inserted and movable along a horizontal path to a position centered on the spindle has spaced levers pivotally movable laterally outwardly from a first position straddling the center line of the path and resiliently urged toward each other; the levers have a first position spaced sufficiently to engage an inserted disc record of either a small size or a large size and be moved outwardly thereby against the resilient element to guide a record of either size to centered position. A pair of generally L-shaped stop members are mounted on the plate straddling the center line in the path of an inserted small size record to locate such a record in its centered position. Two elements actuated by outward movement of both said levers by a large size record are employed for shifting the stop members out of the path to permit a large size record to move to its centered position. A safety and disc record detection circuit is provided.

17 Claims, 19 Drawing Figures

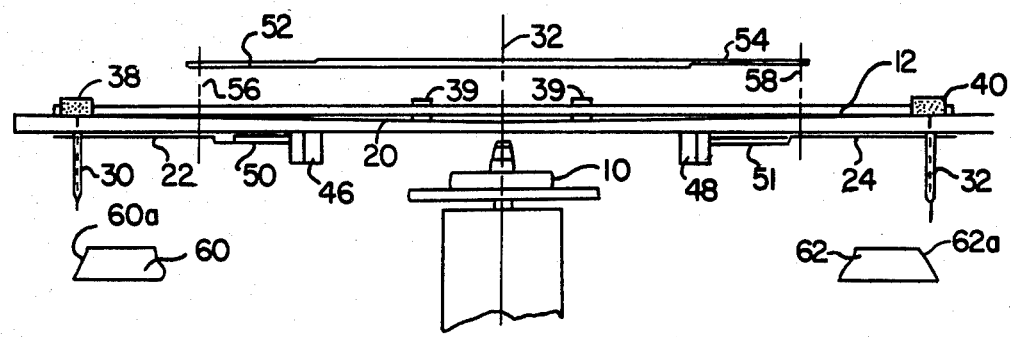
FIG. 4A
FIG. 4
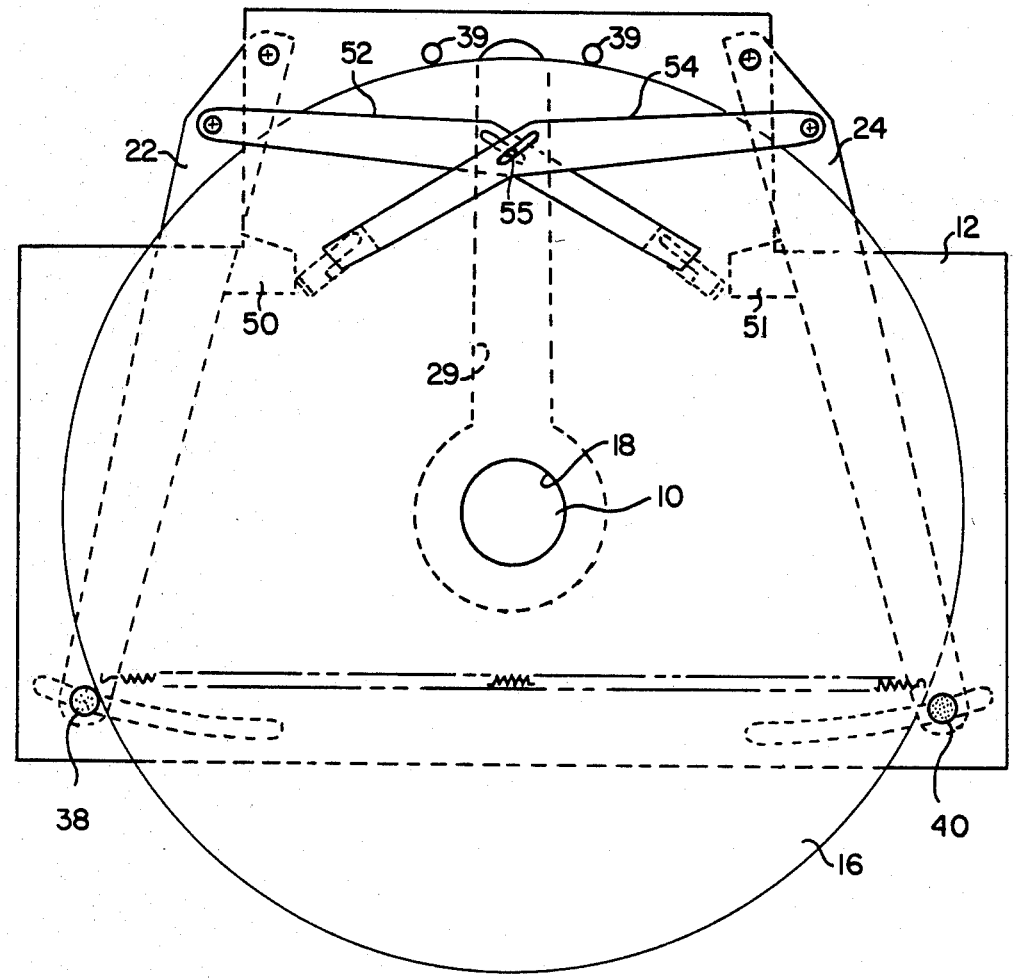

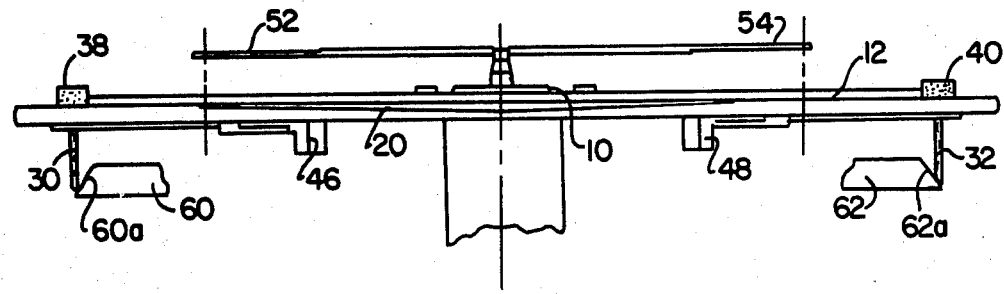
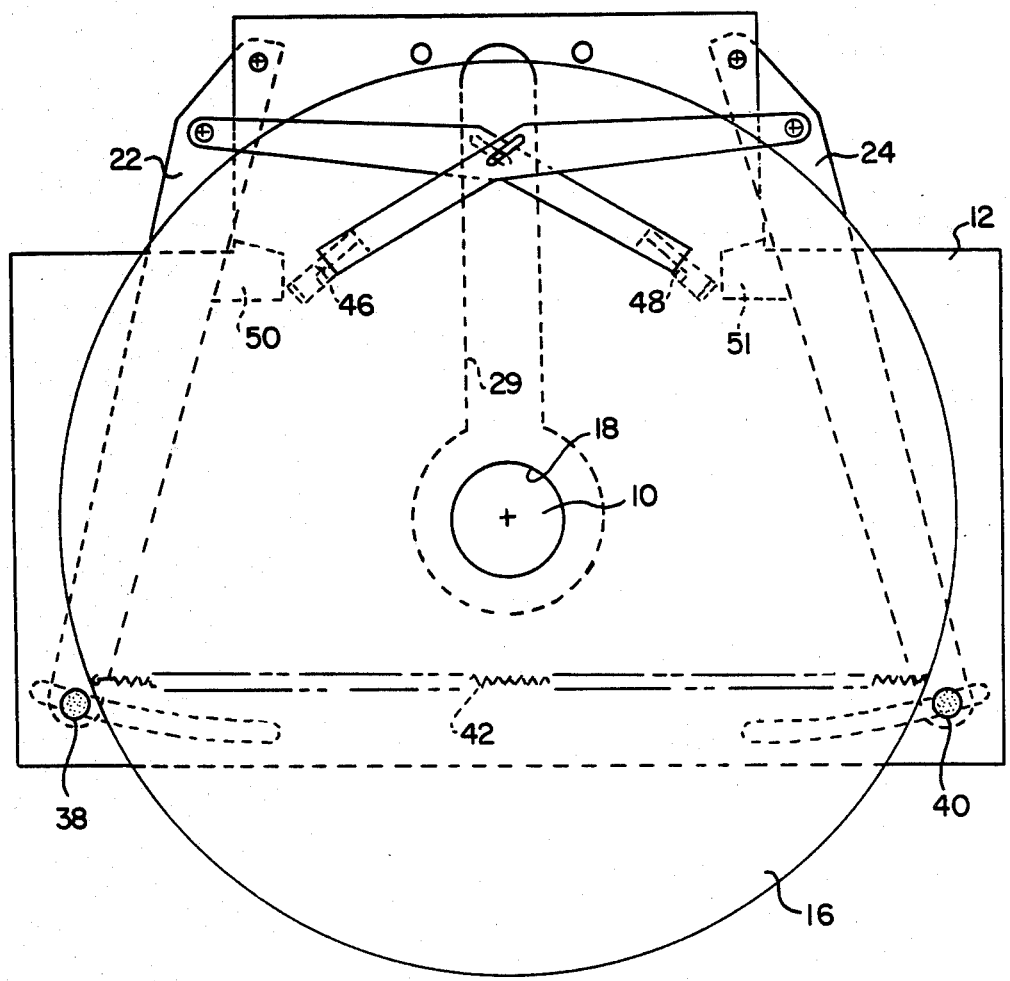

FIG.8
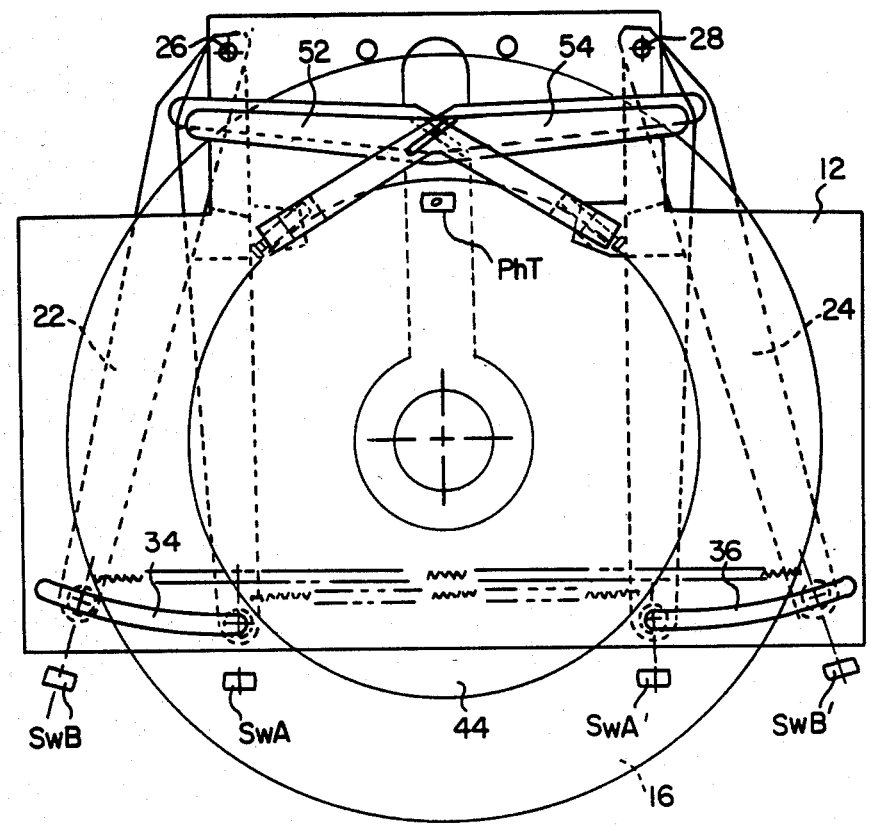
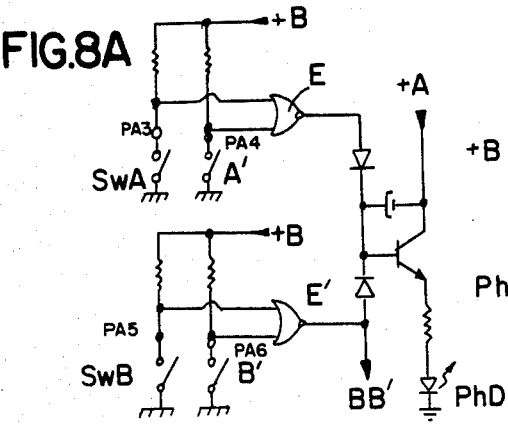
FIG.8A
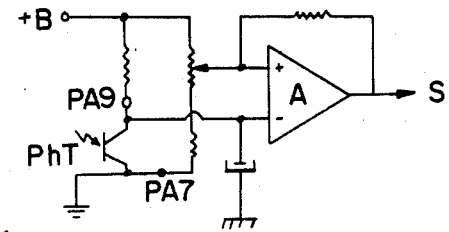
FIG.8B

AUTOMATIC DISC LOADING APPARATUS

TECHNICAL FIELD

The present invention relates to disc record player apparatus and, more particularly, to such apparatus provided with a mechanism for automatically guiding disc records of different size to playing positions centered on a disc drive having a vertical spindle.

BACKGROUND ART

Heretofore, mechanisms for automatically guiding disc records to playing position in slide in type disc record apparatus have had only limited success with the general public due to their complexity and their limited ability to receive records of widely different sizes. Such mechanisms also have not been applied to video disc player apparatus of the type which have recordings read by a laser detection device located beneath a disc record in the central space which is normally occupied by the guiding mechanism but which must be clear to allow radial movement of the laser detection device over the diameter of the disc record.

DISCLOSURE OF THE INVENTION

The principal object of this invention is to provide an improved mechanism for guiding disc records in a player apparatus which is capable of guiding and accurately centering in playing position disc records of widely different size.

Another important object of this invention is to provide an improved mechanism for guiding disc records of different size to playing position which is particularly suited for video disc player apparatus and is located out of the central space required for the laser detection system for reading information recorded on such discs.

A further object of the invention is to provide an improved mechanism for guiding disc records of different size to playing position which is simple in construction and reliable in operation to lower costs of manufacture and reduce expense and difficulty in maintenance.

BRIEF DESCRIPTION OF THE DRAWINGS

Further objects and advantages of the invention will become evident from the detailed description and the accompanying drawings, wherein:

FIG. 4 is a plan view similar to FIG. 3 illustrating the apparatus with the large sized record centered;

FIG. 5 is a view similar to FIG. 4 illustrating the apparatus with elements disengaged from contacting the periphery of the large record centered on the apparatus;

FIGS. 4A and 5A are front elevational views corresponding to FIGS. 4 and 5, respectively;

FIG. 8 is a plan view similar to FIG. 1 but also including switches and electronic safety and detection elements;

FIGS. 8A and 8B are electrical diagrams illustrating circuits including the electronic safety and detection devices;

BEST MODE FOR CARRYING OUT THE INVENTION

Figure 1:
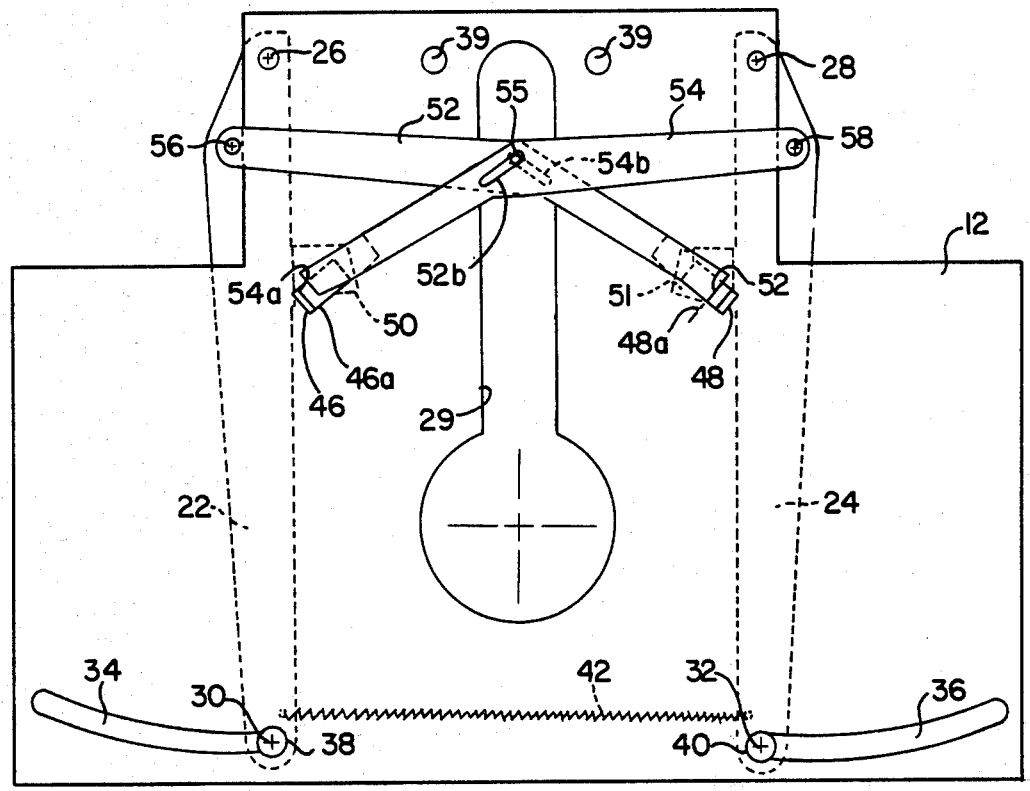
FIG. 1 is a plan view of a disc record player apparatus in accordance with the present invention.

Referring to FIGS. 1 and 4A, a player apparatus is illustrated for video disc records. While this invention is not limited to the field of video disc player apparatus, it has particular utility for such apparatus of the type utilizing a disc drive having a vertical spindle 10. The apparatus includes a horizontal plate 12 which is adapted to slidably receive a disc record inserted horizontally through a loading and unloading slot (not shown); the plate 12 is mounted on the frame of the player apparatus and has an initial position vertically spaced above the spindle 10 for receiving a disc record inserted onto the plate 12. The plate 12 and spindle 10 are mounted on the frame of the apparatus for relative movement axially of the spindle in order to bring an inserted record to playing position on the spindle 10. The mounting arrangement for the plate 12 may comprise a mechanism of the type disclosed in U.S. Ser. No. 437,189, entitled "Loading And Unloading System For Recording And/Or Playback Apparatus", which provides a mounting for moving the plate 12 through an L-shaped path to carry a disc record on the plate 12 downward into engagement with the spindle 10. Alternatively, a mounting arrangement may be utilized for moving the spindle 10 vertically upward into engagement with a disc record on the plate 12.

Figure 3:
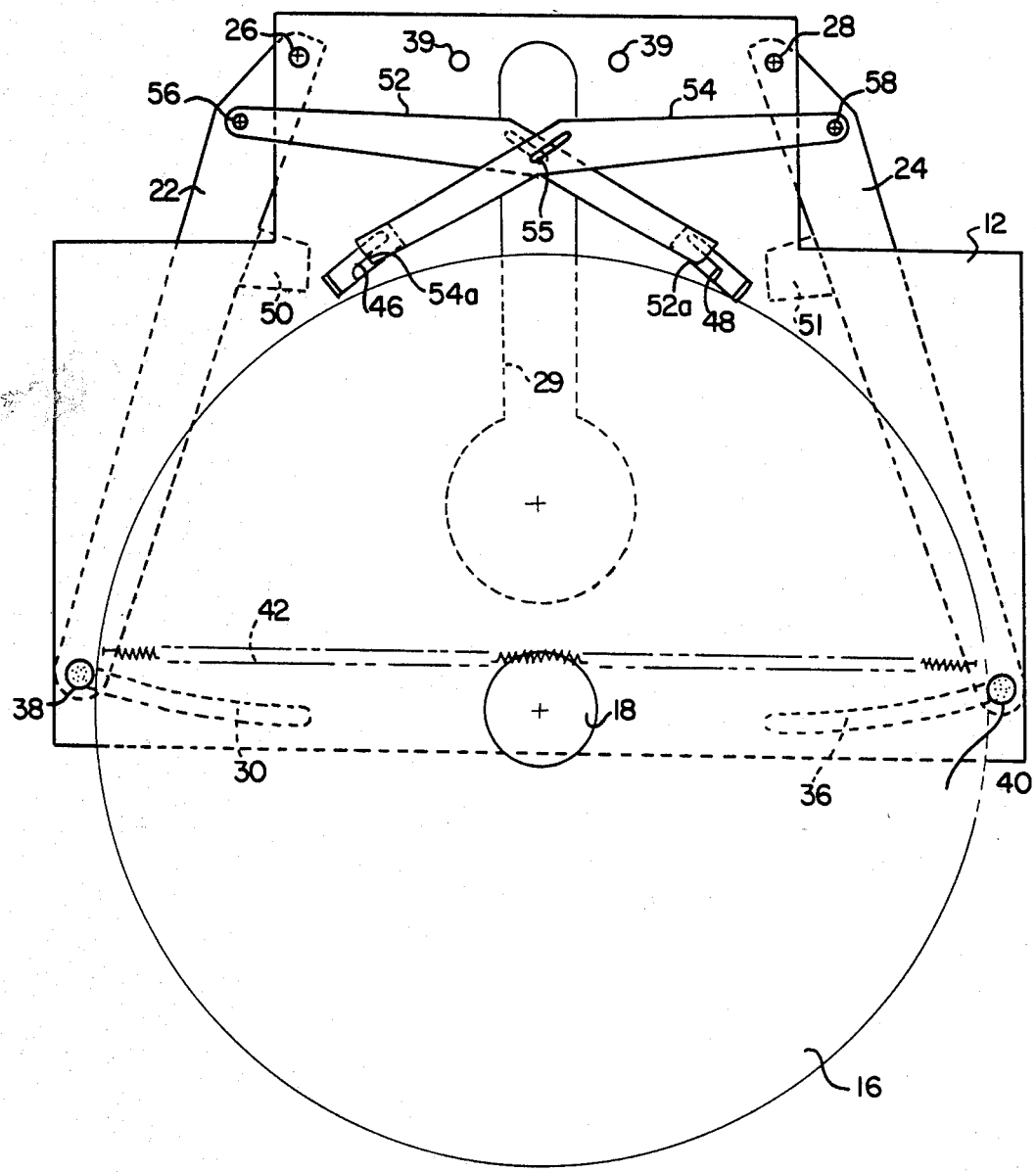
FIG. 3 is a plan view similar to FIG. 1 illustrating the operation of the player apparatus as a large sized disc record is inserted.

With either such mounting arrangement, prior to the relative movement of the spindle 10 and the plate 12, a disc record is inserted and slid on the plate 12 along a horizontal path to a position centered on the axis of the spindle 10. A large sized record 16 is illustrated in the course of such movement in FIG. 3, and is illustrated in FIG. 4 centered on the axis of the spindle 10. The disc record 16 shown in FIGS. 3 and 4 is of large size and has a center hole 18 adapted to receive the hub of the drive spindle 10 and is adapted to be clamped thereto (by means not shown) when the plate 12 and disc record 16 are moved axially relative to each other to the operative position of FIG. 5A. A preferred clamping mechanism is disclosed in copending, commonly assigned, U.S. Ser. No. 457,360, entitled "Disc Player Having Self-Actuated Magnetic Clamping Device".

According to the present invention, the apparatus is provided with mechanism for guiding and centering inserted disc records of different size on the spindle 10. When a disc record is inserted through a loading and unloading entrance slot onto the plate 12, it may be located off-center laterally and the present invention is intended to guide the record, whether of large or small size, into alignment along a center line intersecting the vertical axis of the spindle 10. It is also intended to stop the record, whether of large or small size, at a position in the path of inward movement when the record is located exactly centered on the spindle 10. After the record is brought into centered position, when the plate 12 and spindle 10 are moved relatively axially, as by lowering the plate 12, the record is brought into engagement with the drive spindle 10 and with the hub portion of the spindle 10 entering the hole in the record so that it may be clamped to the spindle for high speed operation. Plate 12 preferably has a V-shaped surface 20 so that an inserted record contacts the surface 20 only at its opposite edges as it slides along the plate. A plate for receiving a record and having such a V-shaped surface is disclosed in commonly assigned U.S. Ser. No. 441,923, entitled "Slot Type Disc Recorder And/Or Player Apparatus".

In carrying out the invention, for guiding inserted disc records in their inward sliding movement along the plate 12, spaced levers 22, 24 are pivotally mounted at their inner ends on the axles 26, 28 so as to be below the plate 12 and extend parallel to the center line of the path of inward movement of the inserted disc records. In the mounted position, the levers 22, 24 are clear of the central region below the plate 12 and, particularly, the path of movement defined by the slot 29 of a laser detecting device for reading information on a centered disc record. The levers 22, 24 have pins 30, 32 at the outer ends of the levers which project upward through curved slots 34, 36 in the plate 12, carrying rubber rollers 38, 40 which are disposed in the path of an inserted record. The spaced levers 22, 24 are movable laterally outward from a first position, shown in FIG. 1, straddling the center line of the path along which an inserted record is moved. The levers 22, 24 are resiliently urged toward each other by means herein shown as an elongated tension spring 42 interconnecting the levers. When a record is inserted it causes the separation of the levers 22, 24 against the force of the resilient means. If a record is inserted offcenter, it will first engage one or the other of the rollers 38, 40, depending on which side of the center line the record is inserted, and the contacted roller (38 or 40) will resiliently force the record toward the center line of the path until the record is symmetrically located.

Figure 6:
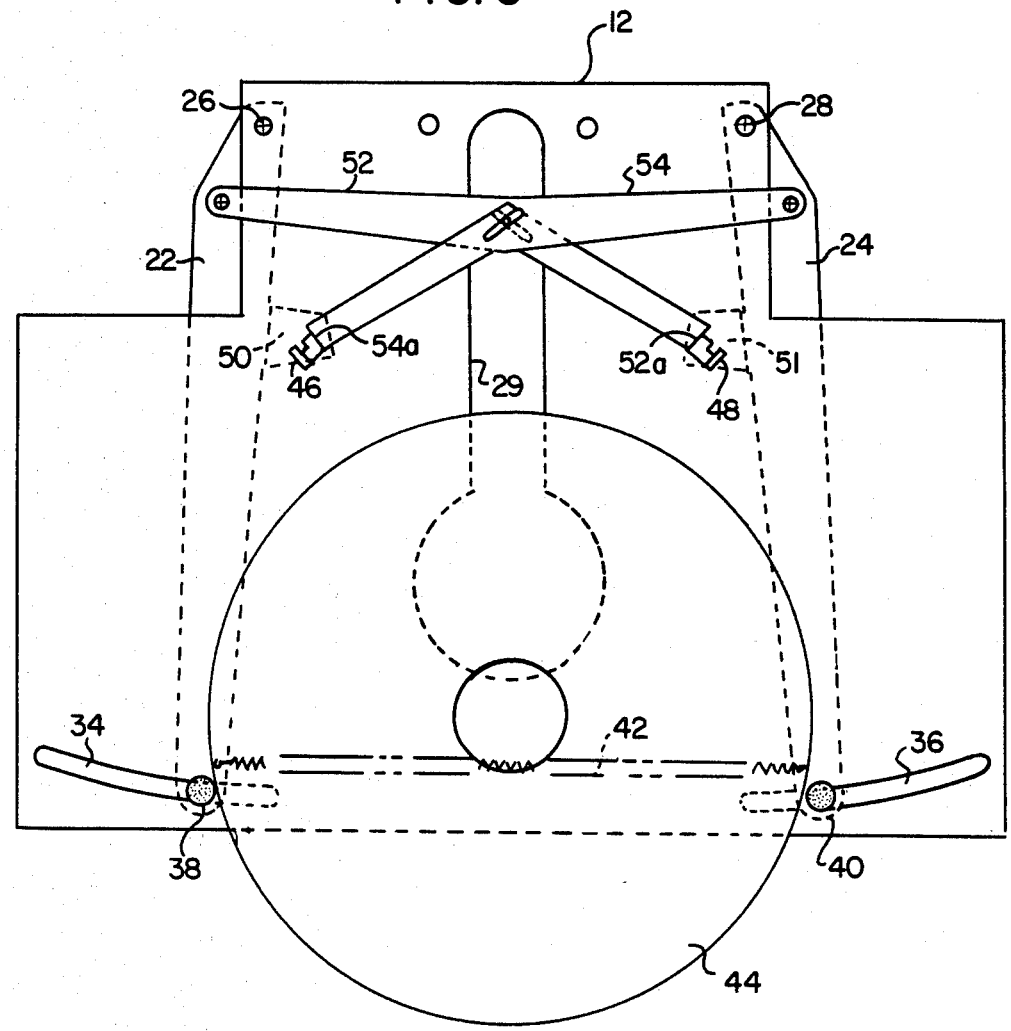
FIG. 6 is a plan view of the apparatus similar to FIG. 3 illustrating the operation of the apparatus with a record of small size inserted.

The levers 22, 24 at the initial position shown in FIG. 1 are spaced sufficiently to contact the periphery of inserted disc records of either small or large size and resiliently force records of either size toward the center line of the path. Thus, while a large size record 16 is shown in FIG. 3 contacting the rollers 38, 40 of both levers 22, 24, a small size record 44 is shown in FIG. 6 in the course of being inserted after passing the point of initial contact with the rollers 38, 40.

For stopping a large size record in its centered position, a pair of posts 39 are provided on the plate 12, positioned to be engaged by the front edge of the disc record as it is inserted. In apparatus wherein the plate 12 is mounted using mechanism of the type disclosed in aforementioned U.S. Ser. No. 437,189, after the disc record is inserted and brought against the posts 39, further inward movement of the disc record is operable to move the plate 12 along an L-shaped path to carry a disc record on the plate 12 to playing position.

Figure 2A:
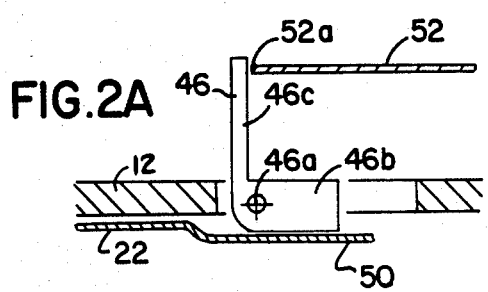
FIGS. 2A, 2B, 2C and 2D are enlarged fragmentary views illustrating the rocking movement of stop means mounted on the disc record playing apparatus shown in FIG. 1.
Figure 2B:
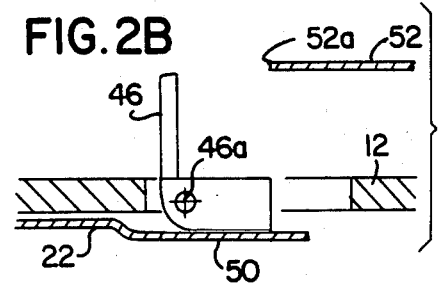
Figure 2C:
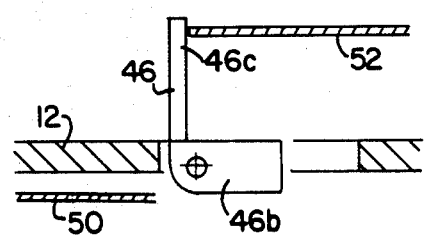
Figure 2D:
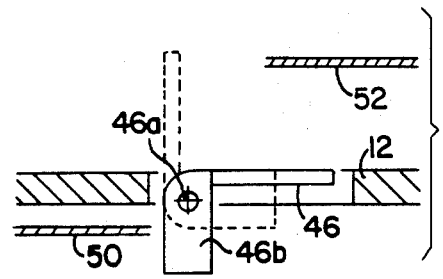

Further in accordance with the invention, a pair of stop means are mounted on the plate 12 straddling the center line and positioned in the path of an inserted record to stop a small size inserted record in its centered position. Means are also provided to shift the stop means out of the path of an inserted record of large size. The stop means, herein shown in FIGS. 2A–2D as L-shaped stop members 46, 48, are mounted on horizontal axles 46A, 48A on the plate 12 to rock between an up position (FIG. 2A) in the path of an inserted record and a down position (FIG. 2D) out of that path. The rocking movement of the stop members 46, 48 is connected with the outward movement of both levers 22, 24 so as to cause the stop members to rock to the down position upon pivotal movement of both levers outwardly from their initial position through a given angular displacement. It will be seen from FIGS. 2A–2D that one of the stop members 46, 48 is located against each of the levers 22, 24. The rocking movement of each of the stop members 46, 48 is connected with the angular position of the adjacent lever 22, 24 by an element in the form of a flap 50, 51 extending from the lever and positioned in contact with the bottom leg 46B, 48B of the L-shaped stop member to hold the stop member in its up position when the lever is located near its inward initial position. The rocking movement of each of the stop members 46A, 46B is also connected with the angular position of the remote lever 22, 24 by an element in the form of a link 52, 54 coupled to the remote lever 22, 24 by an elongated pin 56, 58 and extending parallel to the plate 12 (see FIG. 4A) in a plane above the plate 12 to a position contacting the upper leg 46C, 48C of the L-shaped stop member to hold the stop member in its up position when the remote lever is located near its inward initial position. The pair of links 52, 54 are crossed and both are guided by a pin 55 which extends through intersecting slots 52B, 54B in the links 52, 54 and contact the stop members at the ends 52A, 54A of the links. Thus, the present invention provides means for shifting the stop members out of the path of inward movement of an inserted large size disc record, including two elements associated with each stop member, one of the elements in the form of a flap extending from and being operable by outward movement of the adjacent lever and the other element in the form of a link connected to and being operable by outward movement of the remote lever. To cause the stop members to rock to the down position, both levers 22, 24 require movement through a given angular displacement outwardly from their initial spaced position, which can be achieved only by a large size disc record.

Further in carrying out the invention, means are also provided for moving the rollers 38, 40 away from the periphery of the inserted record when the record is placed in playing position on the spindle 10. For this purpose, on the frame (not shown) which bears the spindle 10 there are provided fingers 60, 62 which have an inclined face, 60A, 62A shown in FIGS. 4A and 5A. The inclined faces 60A, 62A of the fingers 60, 62 engage the lower ends of the pins 30, 32 carrying the rollers 38, 40 to urge the levers 22, 24 slightly outwardly and thereby separate the rollers from the periphery of a disc record on the plate 12, as shown in FIG. 5. This is accomplished by relative movement toward one another of the plate 12 and the fingers 60, 62, as by lowering the plate 12 relative to the spindle 10 to move the disc record to playing position and, in the course of such movement, bringing the pins 30, 32 into contact with the fingers 60, 62.

Figure 7:
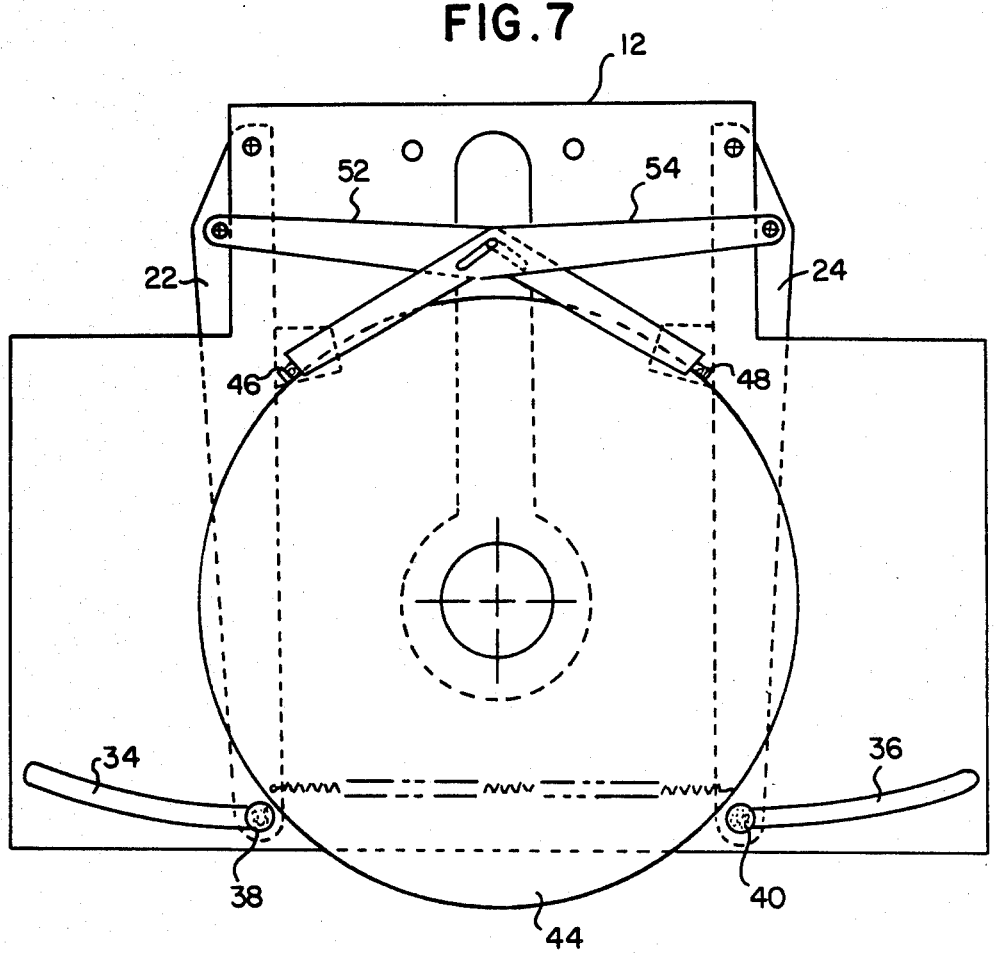
FIG. 7 is a plan view similar to FIG. 4 with a small sized record centered in the apparatus and stop means contacting the periphery of the disc record.

It will be seen in FIG. 7 that with a small size record in playing position on the spindle 10, the rollers 38, 40 are spaced from the periphery of the small size record, which is determined by the initial spacing of the rollers as defined by the ends of the curved guide slots 34, 36 in the plate 12. The stop members 46, 48 may also be separated from the periphery of the small size record by lowering the plate 12 far enough so that, with the disc record clamped on the spindle, there is clearance with the plate and with the stop members.

With respect to the operation of the apparatus upon insertion of a small size disc record, it is important to note that the crossed links 52, 54 insure the maintenance of the two stop members 46, 48 in their operative position in the path of movement of such a small size disc record, even if the disc record is inserted in an asymmetric manner. The entrance slot into which disc records are inserted in such apparatus has substantially the same width or is slightly wider than a large size disc record such that the user might not insert a small size disc record in the center of the slot but to one side. As a result, the lever 22, 24 which is situated on this side would be subject to an angular displacement which is sufficient for the flap element 50, 51 thereof to release the lower leg of the stop member 46, 48 located on the same side. However, if that lever is subjected to a large angular displacement due to the small disc record being inserted in an off-center location, this same disc record, owing to its small diameter, would only cause a very slight angular displacement or even no angular displacement at all of the other lever. Consequently, the link 52, 54 which is associated with the remote lever will not be subject to a displacement which is sufficient to release the upper leg of the stop member on which it acts. Accordingly, it will be clear that, in order to shift the stop members 46, 48 from the path of inward movement of a disc record, both levers 22, 24 must be displaced angularly outwardly a given distance. The movement inwardly of a small disc record will always be limited by the stop members 46, 48 which insures the centering thereof on the spindle 10.

Now turning to FIG. 8, further in keeping with the invention, means are provided for detecting the presence of a disc record in centered position. Switches SWA, SWA' are provided to detect disc records of a small diameter in centered position and switches SWB, SWB' are provided to detect disc records of a large diameter as well as a photo transistor cell PhT. As indicated in FIG. 8A, each pair of switches SWA, SWA' or SWB, SWB' actuate a NOR gate E or E'. If either pair of switches are actuated, producing a signal from the NOR gates E or E', a photo diode PhD, which emits light, is supplied from the source +A and the photo transistor PhT receiving light when the disc record is centered. When the photo transistor PhT receives light, a signal is generated at the output terminal S, which may be utilized to control the starting of the record loading cycle or for any other desired function. When the output terminal S no longer receives a signal, a different function may be carried out, for example, the record may be rejected.

Figure 9A:
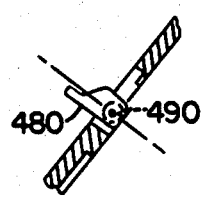
FIGS. 9A and 10A are fragmentary detail views of the stop members in the positions occupied in FIGS. 9 and 10, respectively.
Figure 9:
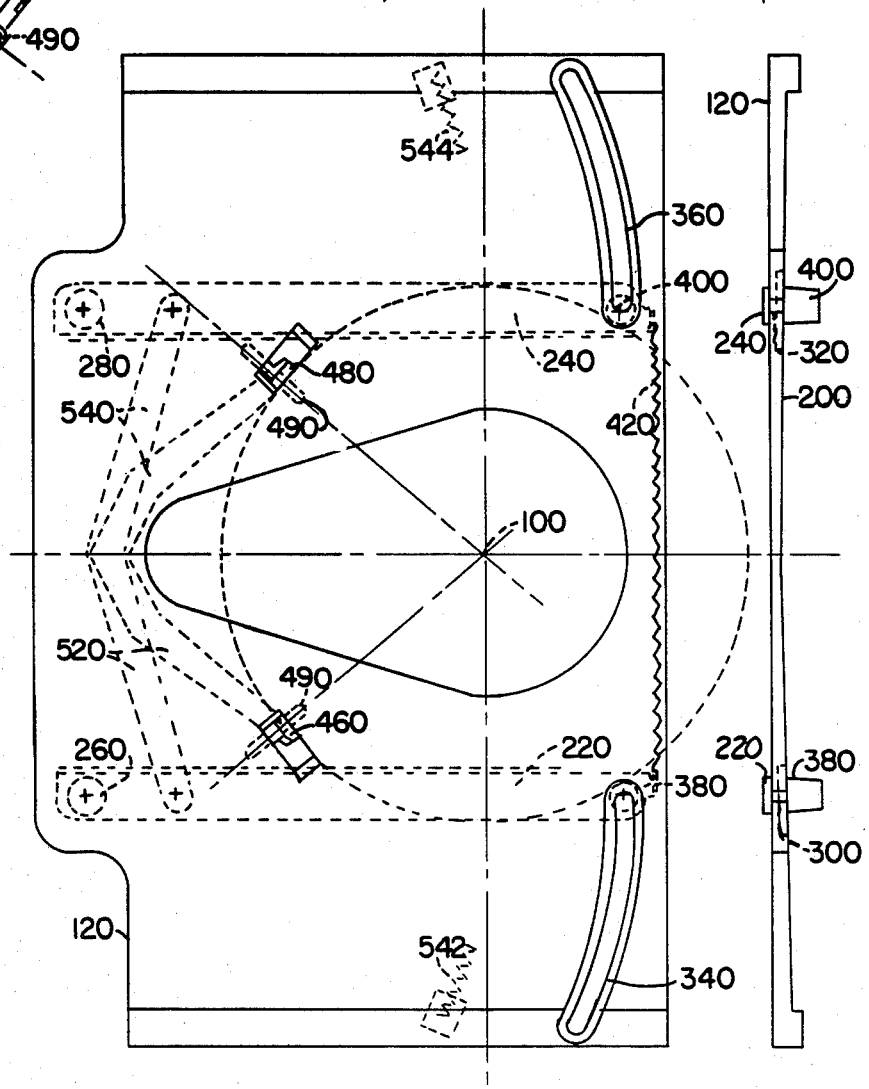
FIGS. 9 and 10 are plan views of an alternative embodiment of the invention applied to a player for conventional phonograph records.
Figures 10, 10A:
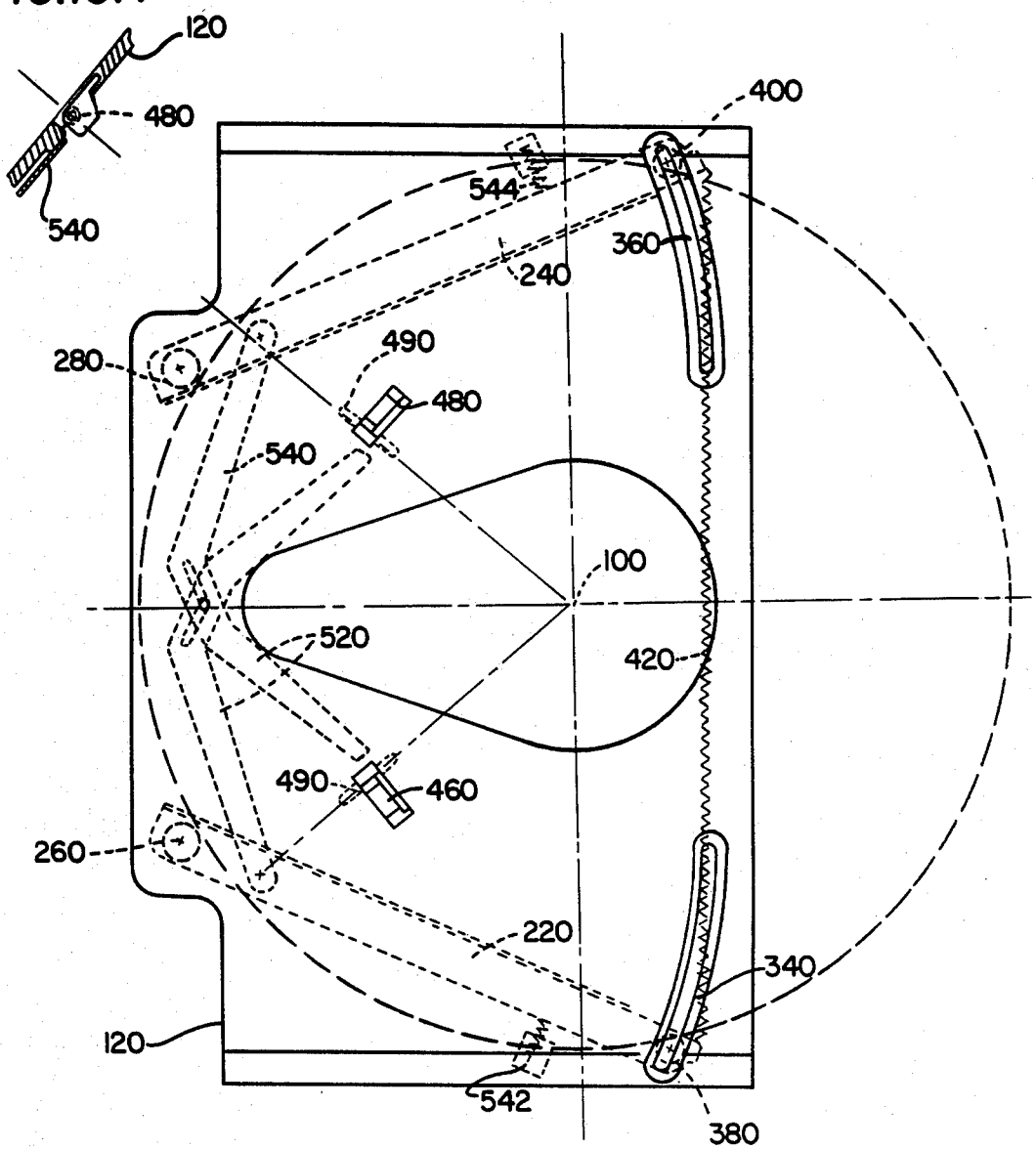

Referring to FIGS. 9 and 10, an embodiment of the invention is illustrated particularly suited for conventional turntables. As in the first disclosed embodiment, a plate 120 arranged in a horizontal plane and having a V-shaped surface 200 is provided for receiving a disc record of either small size or large size. For guiding disc records in their inward sliding movement, a pair of spaced levers 220, 240 are pivotally mounted at their inner ends on axles 260, 280 and are positioned below the horizontal plate 120 so as to extend parallel to the center line of the path of inward movement of the inserted disc records. The levers 220, 240 have rollers 380, 400 at the outer ends of the levers on pins 300, 320 which project upwards through curved slots 340, 360 in the plate 120 such that they are disposed in the path of an inserted record. The spaced levers 220, 240 are movable laterally outward from a first position straddling the center line of the path along which an inserted record is moved to centered position on the spindle 100. The levers 220, 240 are resiliently urged toward each other by means herein shown as an elongated spring 420 interconnecting the levers.

In accordance with this aspect of the invention, a pair of stop members 460, 480 are provided, generally L-shaped in configuration, mounted on axles 490 so as to rock from an upward to a downward position and adapted to be held in their upward position by the end of one of a pair of crossed links 520, 540, providing control elements extending from the levers 220, 240. In this case, as contrasted with the first embodiment of the invention, only a single element controls the position of each of the stop members 520, 540, that element being connected to the angular movement of the remote lever 220, 240 on the opposite side of the center line of the path of movement of the disc records.

Referring to FIG. 10, a large size record is shown in dashed lines in centered position. The levers 220, 240, having been urged outwardly, are brought to bear against a pair of compression springs 542, 544 which augment the spring force exerted by the tension spring 420 interconnecting the levers, to insure a positive centering force on such large size disc records. With the levers 220, 240 fully extended to their outward position, both links 520, 540 are disengaged from contact with the stop members 460, 480, permitting them to rock out of the path of an inserted record.

Referring to FIG. 9, a small size record is shown in centered position and, as will be seen from this Figure, both crossed links 520, 540 remain in engagement with the under edges of the stop members 460, 480, thus maintaining the stop members in an up position. The up position of a stop member is illustrated in FIG. 9A and the down position of a stop member is illustrated in FIG. 10A. In this case, both the lateral levers and the cross links are located beneath the horizontal plate 120 on which the inserted records are slidable to centered position.

While no means are illustrated for this purpose, the stop members 460, 480 and rollers 380, 400 may be disengaged from the periphery of the records by mechanisms operated by and included in the record player apparatus once their centering function has been performed.

I claim:
1. In a disc record player apparatus,
mechanism for guiding and centering disc records on a disc record drive having a vertical spindle comprising, in combination:
a horizontal plate for receiving a disc record inserted and movable along a horizontal path to a position centered on said spindle;
means on said plate for guiding inserted disc records of different size to said centered position, including:
spaced levers pivotally movable laterally outwardly from a first position straddling the center line of said path;
means resiliently urging said levers toward each other;

said levers at said first position being spaced sufficiently to engage an inserted disc record of either a small size or a large size and be moved outwardly thereby against said resilient means to guide a record of either size to centered position;

a pair of stop means mounted on said plate straddling said center line in the path of an inserted small size record to locate such a record in said centered position; and means actuated by outward movement of both said levers by a large size record for shifting said stop means out of said path to permit a large size record to move to said centered position.

2. An apparatus according to claim 1 in which each said stop means comprises an L-shaped stop member pivotally mounted to rock from an up position with one leg extending above said horizontal plate in said path to a down position with said leg substantially in the surface of said horizontal plate out of said path.

3. An apparatus according to claim 2 in which said means for shifting said stop members out of said path include elements extending from said levers and cooperating to cause said stop members to rock to said down position upon pivotal movement of both said levers outwardly from said first position through a given angular displacement.

4. An apparatus according to claim 1 in which one of said stop means is located adjacent each of said levers and said means for shifting said stop means includes two elements associated with each said stop means, one of said elements extending from and being operable by outward movement of the adjacent lever and the other of said elements being operable by outward movement of the remote lever, both levers requiring movement through a given angular displacement to operate said elements to shift said stop means out of said path.

5. An apparatus according to claim 2 in which one of said stop means is located adjacent each of said levers and said means for shifting said stop means includes two elements associated with each said stop means, one of said elements extending from and being operable by outward movement of the adjacent lever and the other of said elements being operable by outward movement of the remote lever, both levers requiring movement through a given angular displacement to operate said elements to shift said stop means out of said path.

6. An apparatus according to claim 3 in which one of said stop means is located adjacent each of said levers and said means for shifting said stop means includes two elements associated with each said stop means, one of said elements extending from and being operable by outward movement of the adjacent lever and the other of said elements being operable by outward movement of the remote lever, both levers requiring movement through a given angular displacement to operate said elements to shift said stop means out of said path.

7. An apparatus according to claim 1 in which one of said stop means and one of said levers is located on each side of said center line and said means for shifting said stop means includes an elongated link connected to and operable by outward movement of the lever on the remote side of said center line, both levers requiring movement through a given angular displacement to shift said stop means out of said path.

8. An apparatus according to claim 2 in which one of said stop means and one of said levers is located on each side of said center line and said means for shifting said stop means includes an elongated link connected to and operable by outward movement of the lever on the remote side of said center line, both levers requiring movement through a given angular displacement to shift said stop means out of said path.

9. An apparatus according to claim 3 in which one of said stop means and one of said levers is located on each side of said center line and said means for shifting said stop means includes an elongated link connected to and operable by outward movement of the lever on the remote side of said center line, both levers requiring movement through a given angular displacement to shift said stop means out of said path.

10. An apparatus according to claim 3 in which each said stop means comprises an L-shaped member and two elements are provided, each connected to one of said levers, for shifting each said stop member cooperating with a different leg of said L-shaped stop member.

11. An apparatus according to claim 1 in which said levers are mounted below said horizontal plate and rollers are carried by said levers projecting above said horizontal plate for engagement by the periphery of inserted disc records.

12. An apparatus according to claim 2 in which said levers are mounted below said horizontal plate and rollers are carried by said levers projecting above said horizontal plate for engagement by the periphery of inserted disc records.

13. An apparatus according to claim 3 in which said levers are mounted below said horizontal plate and rollers are carried by said levers projecting above said horizontal plate for engagement by the periphery of inserted disc records.

14. An apparatus according to claim 3 in which said levers are mounted below and said elongated links are mounted above said horizontal plate for cooperation with a different leg of said L-shaped stop member.

15. An apparatus according to claim 1 including switches for detecting the angular positions of the levers corresponding to either a small size disc record or a large size disc record in centered position, and circuit means including said switches for generating a signal representing the presence of a disc record of either size in centered position.

16. An apparatus according to claim 2 including switches for detecting the angular positions of the levers corresponding to either a small size disc record or a large size disc record in centered position, and circuit means including said switches for generating a signal representing the presence of a disc record of either size in centered position.

17. An apparatus according to claim 3 including switches for detecting the angular positions of the levers corresponding to either a small size disc record or a large size disc record in centered position, and circuit means including said switches for generating a signal representing the presence of a disc record of either size in centered position.

* * * * *